US012572756B2

(12) United States Patent
Solomon et al.

(10) Patent No.: US 12,572,756 B2
(45) Date of Patent: Mar. 10, 2026

(54) DISCOVERY AND SELECTION OF CONTENT BASED ON LANGUAGE MODEL TOKEN RESTRICTIONS

(71) Applicant: MICROSOFT TECHNOLOGY LICENSING, LLC, Redmond, WA (US)

(72) Inventors: Alexandra Cheryl Solomon, New York, NY (US); Ryan Martin Nadel, Vancouver (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 202 days.

(21) Appl. No.: 18/584,960

(22) Filed: Feb. 22, 2024

(65) Prior Publication Data

US 2025/0272504 A1 Aug. 28, 2025

(51) Int. Cl.
*G06F 17/00* (2019.01)
*G06F 16/2458* (2019.01)
(Continued)

(52) U.S. Cl.
CPC .......... *G06F 40/40* (2020.01); *G06F 16/2477* (2019.01); *G06F 40/166* (2020.01); *G06F 40/284* (2020.01)

(58) Field of Classification Search
CPC ...... G06F 40/40; G06F 40/166; G06F 40/284; G06F 16/2477
See application file for complete search history.

(56) References Cited

U.S. PATENT DOCUMENTS 11,989,507 B2 * 5/2024 Tunstall-Pedoe ....... G06F 40/56
12,450,273 B1 * 10/2025 Bi ........................ G06F 16/3347
(Continued)

FOREIGN PATENT DOCUMENTS

CN 116501845 A 7/2023
CN 116521893 A 8/2023
(Continued)

OTHER PUBLICATIONS

Kohn, Russell., "Mastering Token Limits and Memory in ChatGPT and other Large Language Models", Retrieved from: https://medium.com/@russkohn/mastering-ai-token-limits-and-memory-ce920630349a, Mar. 2021, 13 Pages.

*Primary Examiner* — Laurie A Ries
(74) *Attorney, Agent, or Firm* — Scott Y. Shigeta; Newport IP, LLC

(57) ABSTRACT
The disclosed techniques can overcome challenges that arise when large language models are used for summarizing documents that exceed the token limit of a LLM. The disclosed techniques communicate contextually relevant segments of a document with customized prompts to an LLM for generating a summary. A subset of segments can be selected from a document based one or more factors, including but not limited to, a token count of content of the select segments, a determination that the token count of content of the select segments does not exceed a token limit of the large language model. The subset of segments can also be selected based on a determination that the selected segments meet one or more criteria with respect to specific user activity. Thus, the system can also provide technical solutions that can use an LLM to discover content of interest stored in large files.

20 Claims, 15 Drawing Sheets

(51) Int. Cl.
    *G06F 40/166*     (2020.01)
    *G06F 40/284*     (2020.01)
    *G06F 40/40*     (2020.01)

(56)       References Cited

U.S. PATENT DOCUMENTS

| | | | |
|---|---|---|---|
| 12,452,643 B2 * | 10/2025 | Mars | H04L 9/3234 |
| 2016/0259778 A1 * | 9/2016 | Cookson | G06F 40/284 |
| 2024/0176960 A1 * | 5/2024 | Maurer | G06F 16/345 |
| 2024/0362476 A1 * | 10/2024 | Grenader | G06F 16/24522 |
| 2024/0370517 A1 * | 11/2024 | DeVos | G06F 40/30 |
| 2024/0403569 A1 * | 12/2024 | Berglund | G06F 40/40 |
| 2025/0021739 A1 * | 1/2025 | Shin | G06F 40/103 |
| 2025/0148192 A1 * | 5/2025 | Shahid | G06F 40/30 |
| 2025/0156413 A1 * | 5/2025 | Barkan | G06F 40/295 |
| 2025/0165721 A1 * | 5/2025 | Eisenstadt | G06F 40/40 |
| 2025/0190460 A1 * | 6/2025 | Madisetti | G06F 16/3329 |
| 2025/0200100 A1 * | 6/2025 | Hintz | G06F 40/40 |
| 2025/0201241 A1 * | 6/2025 | Zhong | G06F 16/33295 |
| 2025/0245421 A1 * | 7/2025 | Pourroy | G06F 40/166 |

FOREIGN PATENT DOCUMENTS

| | | | | |
|---|---|---|---|---|
| CN | 116579630 A | 8/2023 | | |
| CN | 116795968 A | 9/2023 | | |
| CN | 116955613 A | 10/2023 | | |
| WO | WO-2024071995 A1 * | 4/2024 | | G06F 16/90332 |
| WO | WO-2024096897 A1 * | 5/2024 | | G06Q 10/04 |

* cited by examiner

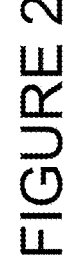

🔷 COPILOT

Get key info from the chat
Copilot can summarize the conversation and key takeaways

LAST WEEK
3 PHONE CALL TRANSCRIPTS
1 MEETING TRANSCRIPT

SELECTED CONTENT:    LLM TOKEN LIMIT:
7,431 TOKENS     V     8,192

WHAT DID ALLAN SAY ABOUT THE FINAL
VERSION OF THE CODE?

EVENTS:

MEETING 12/27
PARTICIPANTS: ALLAN, SARAH, PAUL
TRANSCRIPT = 3,230 TOKENS

CALL 12/27
TRANSCRIPT = 1,320 TOKENS

CALL 12/28
TRANSCRIPT = 972 TOKENS

CALL 12/29
TRANSCRIPT = 1,909 TOKENS

$T_1$

🔷 COPILOT

Get key info from the chat
Copilot can summarize the conversation and key takeaways

WEEK OF 12/17/23
3 PHONE CALL TRANSCRIPTS
1 MEETING TRANSCRIPT

SELECTED CONTENT:    LLM TOKEN LIMIT:
7,033 TOKENS     V     8,192

WHAT DID ALLAN SAY ABOUT THE FINAL
VERSION OF THE CODE?

EVENTS:

MEETING 12/20
PARTICIPANTS: ALLAN, MIKE, DAVID
TRANSCRIPT = 4,230 TOKENS

MEETING 11/29
TRANSCRIPT = 2,803 TOKENS

$T_2$

🔷 COPILOT

Get key info from the chat
Copilot can summarize the conversation and key takeaways

11/29/23 TO 12/16/23
2 MEETING TRANSCRIPTS

SELECTED CONTENT:    LLM TOKEN LIMIT:
7,302 TOKENS     V     8,192

WHAT DID ALLAN SAY ABOUT THE FINAL
VERSION OF THE CODE?

EVENTS:

MEETING 12/14
PARTICIPANTS: ALLAN, MIKE, DAVID
TRANSCRIPT = 4,230 TOKENS

MEETING 11/29
PARTICIPANTS: ALLAN, SARAH, DONALD
TRANSCRIPT = 3,072 TOKENS

In response to the query text, the system determines and displays a timeline and events in the timeline, the events being associated with content having a number of tokens below a threshold In response to the query text, the system determines and displays a timeline and events in the timeline, the events being associated with content having a number of tokens below a threshold In response to the query text, the system determines and displays a timeline and events in the timeline, the events being associated with content having a number of tokens below a threshold In response to the query text, the system determines and displays a timeline and events in the timeline, the events being associated with content having a number of tokens below a threshold Subset of
Segments
112

12/19/23 4:20 PM
12/20/23 10:19 AM
12/22/23 11:01 AM
12/27/23 3:32 PM
12/29/23 9:11 AM
1/3/24 1:30 PM
1/4/24 4:40 PM

Document
Segments
114

DOCUMENT 104A
(CHAT THREAD)

12/19/23 11:20 AM
12/19/23 4:20 PM
12/20/23 10:19 AM
12/21/23 11:00 AM
12/21/23 1:12 PM
12/22/23 11:01 AM
12/26/23 1:29 PM
12/27/23 3:47 PM
12/27/23 2:12 PM
12/27/23 3:32 PM
12/28/23 1:39 PM
12/29/23 9:11 AM
12/29/23 4:49 PM
1/2/24 10:11 AM
1/3/24 1:30 PM
1/4/24 11:33 AM
1/4/24 4:40 PM

User has de-selected content from a content type, e.g., Phone calls

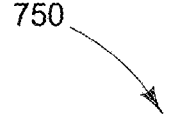

750

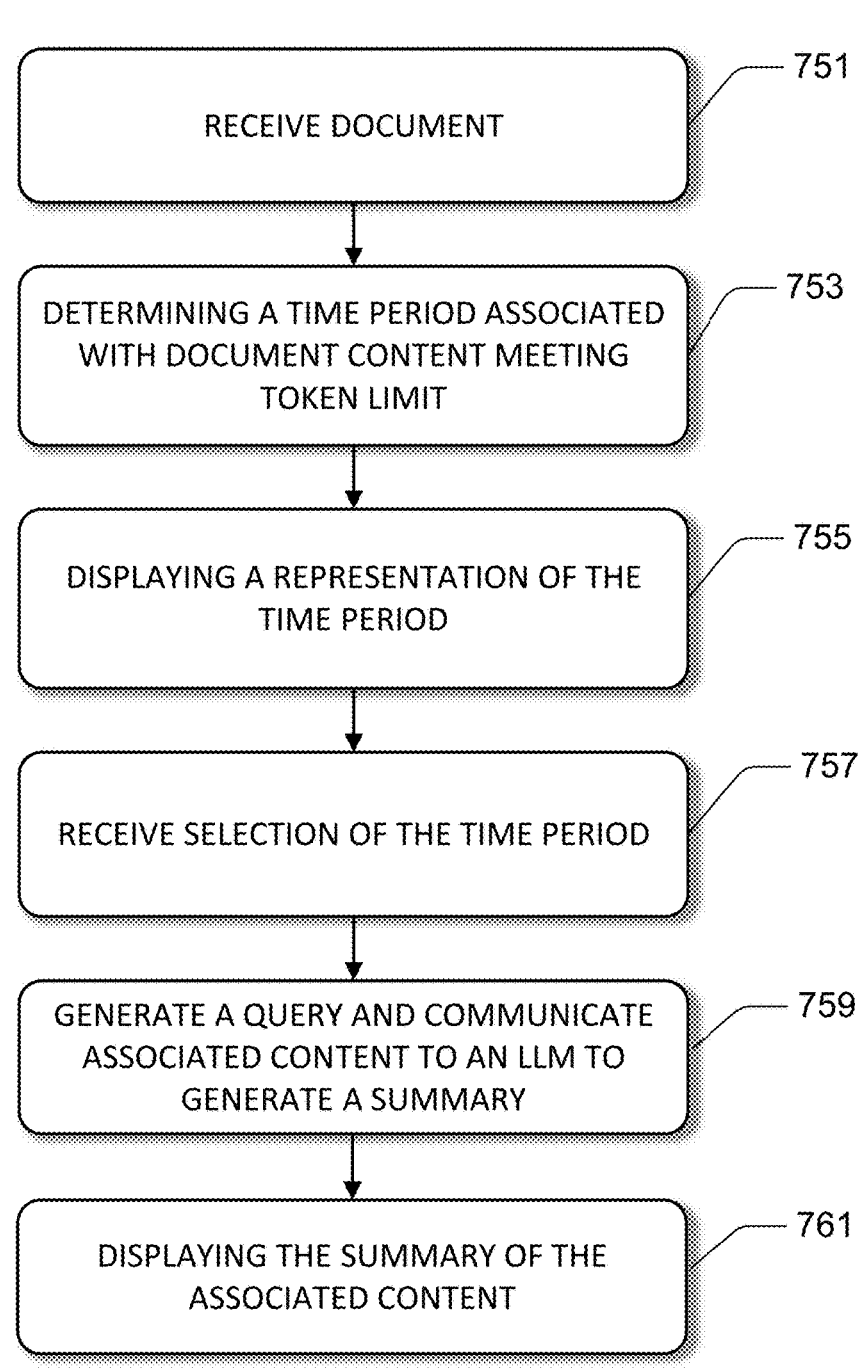

```
┌─────────────────────────────────┐
│        RECEIVE DOCUMENT         │────── 751
└─────────────────────────────────┘
                │
                ▼
┌─────────────────────────────────┐
│ DETERMINING A TIME PERIOD        │
│ ASSOCIATED WITH DOCUMENT CONTENT │────── 753
│ MEETING TOKEN LIMIT              │
└─────────────────────────────────┘
                │
                ▼
┌─────────────────────────────────┐
│ DISPLAYING A REPRESENTATION OF   │────── 755
│ THE TIME PERIOD                  │
└─────────────────────────────────┘
                │
                ▼
┌─────────────────────────────────┐
│ RECEIVE SELECTION OF THE TIME    │────── 757
│ PERIOD                           │
└─────────────────────────────────┘
                │
                ▼
┌─────────────────────────────────┐
│ GENERATE A QUERY AND COMMUNICATE │
│ ASSOCIATED CONTENT TO AN LLM TO  │────── 759
│ GENERATE A SUMMARY               │
└─────────────────────────────────┘
                │
                ▼
┌─────────────────────────────────┐
│ DISPLAYING THE SUMMARY OF THE    │────── 761
│ ASSOCIATED CONTENT               │
└─────────────────────────────────┘
```

DISCOVERY AND SELECTION OF CONTENT BASED ON LANGUAGE MODEL TOKEN RESTRICTIONS

BACKGROUND

There are a number of systems that allow users to communicate. For example, some systems allow people to collaborate by sharing content using video streams, shared files, chat messages, etc. Some systems allow people to share messages on threads that are part of an on-line meeting or a group conversation within a document or spreadsheet. Such systems can also generate a transcript of a meeting or a phone call. The message threads and transcripts can include sections of text that are each associated with a timestamp and an identified speaker.

Although existing systems provide features that allow people to share content using a number of different forms of media, some of these systems still have a number of drawbacks. For example, in some situations, it may be difficult for a person to recall the details of a specific conversation. For example, given the number of different forms of media, it may also be difficult for a person to recall where a specific conversation was recorded, e.g., in a meeting transcript, chat message, email thread, etc. Even with text search capabilities, a person may have to conduct a number of manual searches to locate relevant content, and manually review any discovered content to find the details they are looking for. This may be a particularly difficult process given the volume of content that is stored over long periods of time.

To address the above-described challenges, some systems utilize Large Language Models (LLMs) to help users identify specific content that may be recorded in emails and meeting chat threads. For instance, a system using an LLM can generate a summary of a meeting transcript. This can be helpful in discovering tasks, decisions, and questions that are discussed over the course of serval meetings or conversations. Although an LLM can help users identify content, some collaboration systems raise new challenges in that chat threads and email threads can theoretically be infinite in length. Given the amount of content that is shared in today's systems, it is difficult for LLMs to be used to summarize collaborative content because each LLM has a token limit that restricts the amount of information that can be processed in each query.

Tokens are the building blocks of text that are processed in LLMs, with each token ranging from one character to one word in length. Some systems can have a token limit ranging from a few thousand tokens up to tens of thousands of tokens. Thus, it may be difficult for a person to provide a large chat thread, which can potentially have millions of tokens, as an input to an LLM. Some systems can try to send a chat thread in chunks, but such methods can lose the context of a conversation if the right sections of the chat thread are not sent to the LLM.

The above-described issues can raise a number of inefficiencies in computing systems when it comes to locating specific content. For example, by requiring users to conduct a manual search for information, some existing systems create a number of inefficiencies with respect to time and resources, such as network and computational resources. When conducting manual searches, users may have to send multiple queries to different systems to find specific information they are looking for. This occurs when a user is unsure if the information they are looking for could be in an email, a chat thread, a text message, a transcript, etc. This can lead to an iterative process involving the communication and processing a number of queries and search results. In addition, a manual search for specific information can be time consuming for users since they have to manually review the results of multiple queries to find the specific information they are looking for. In another example, when LLMs are not utilized efficiently, e.g., a system not identifying the specific information for a user, users tend to send multiple requests to an LLM in search of their specific information, which can be costly when it comes to power, network, and storage consumption. In addition, some existing systems do not lead to a positive user experience as interactions can be cumbersome and prove to be an inefficient use of time that may not yield accurate summaries of desired content.

SUMMARY

The techniques disclosed herein address technical challenges that arise when large language models (LLMs) are used for summarizing documents that exceed the LLM token limit. The disclosed techniques can overcome these technical challenges and provide improved efficient use of computing resources by the use of technical solutions that select particular segments of a document to be used as grounding content for an LLM. The grounding content and customized prompts can be communicated to an LLM for generating summaries of the select segments. The document can be in the form of a live document or a static document. For example, the document can be in the form of a chat thread, meeting transcript, calendar, phone call transcript, etc. A subset of segments can be selected from the document based on one or more factors, including but not limited to, a determination that a token count of the subset of segments does not exceed a token limit of the large language model. The subset of segments can also be selected based on a time period. For instance, if the document is in the form of a chat thread, the selected segments may include messages within a time period, e.g., messages from last week, or messages from an event, e.g., the last two meetings. The subset of segments can also be selected based on the detection of particular activity, such as communication bursts, detection of contextually relevant segments, etc. For instance, in a chat thread, certain messages having a threshold level of activity or messages pertaining to particular topics, users, and/or events can be selected for use as grounding content. By introducing a system that only uses a portion of document that is selected using a token limit, users can utilize an LLM for processing documents that have a potentially unlimited size. The token limit and other criteria for selecting document segments also enables a system to address the technical issues that make it difficult for users to find relevant information by providing technical solutions that can use an LLM to discover content of interest stored within large volumes of data stored in many different formats.

In one illustrative example, the system generates a user interface providing a number of choices for users to be able to control a range of content to be used with an LLM query. This could be a smart list of options, e.g., content from the "last meeting" or the "past week." The smart list of options is limited to options where content associated with a particular timeline has a token count that does not exceed a predetermined token limitation. The smart list of options can also include other formats, including but not limited to a calendar that controls the display of selectable dates based on a token count of the content associated with those dates meeting a threshold limit. The choices displayed on a calendar can also be dynamically controlled by the amount of content on any given time period. If a particular time period is associated with content that exceeds a token count, the system can provide a notice and/or make an adjustment to that time period. The system can also display data showing the volume of content for a particular time period, and also display an indication of a type of content, e.g., meeting transcript, chat history, etc. In some configurations, the system generates a user interface that informs users of the default content range. For instance, if the document is in the form of a chat thread, the system can convert a number of characters or tokens from certain messages into days for user understanding. The system can also update the displayed number dynamically if a user changes the default range, to show what the system would be using with each adjustment.

By providing displayed indications of a time period and dynamically adjusted time periods, the system can set user expectations. Thus, instead of just displaying a token count, a system can display an understandable notification indicating that a query to an LLM is based on content that was generated within a certain time period, e.g., the past week, or based on a particular type of content, e.g., phone call transcripts, chat threads, etc. By displaying a time period or a list of time periods that are based on a token limit, and by providing a notification that describes the limitations of the content in an understandable format, the system can provide effective, usable instructions that allows the computer user to effectively and immediately respond to the notification. Users can make adjustments to a displayed time period, displayed events, or a selection of different media formats instead of requiring a user to make adjustments solely on displayed data indicating a token count.

The disclosed techniques address the technical problems of inefficient use of computing resources by providing technical solutions that allow systems to utilize LLMs to interpret and summarize documents that are normally too large for such AI models. In addition, the disclosed techniques enable a system to accurately summarize portions of large documents in a manner that maintains the context during the interpretation process by only communicating relevant information with an LLMs, instead of sending generalized blocks of a file that is divided by arbitrary methods. The system can save a considerable amount of network resources and processing resources, along with a reduction of unnecessary use of screen space, by reducing or eliminating the need for manual searches of vast amounts of information. Manual searching can take more time and resources, such as network and computational resources, as users have to send a large number of queries to sift through large volumes of data. Also, LLMs are utilized more efficiently using these techniques. By providing more contextually accurate summaries, the disclosed systems reduce the number of queries a user has to send to a search engine or an LLM. This can save a system a considerable amount of power, network, and storage consumption. In addition, the disclosed systems provide improved results over traditional lexical searches that depend on keyword matching. The grounding content disclosed herein also enables an LLM to provide richer synthesized responses.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2 shows a series of user interface transitions the occur when a user selects time periods from a smart list.

FIG. 8 is a flow diagram showing aspects of a routine for implementing the disclosed techniques.

DETAILED DESCRIPTION

Figure 1:
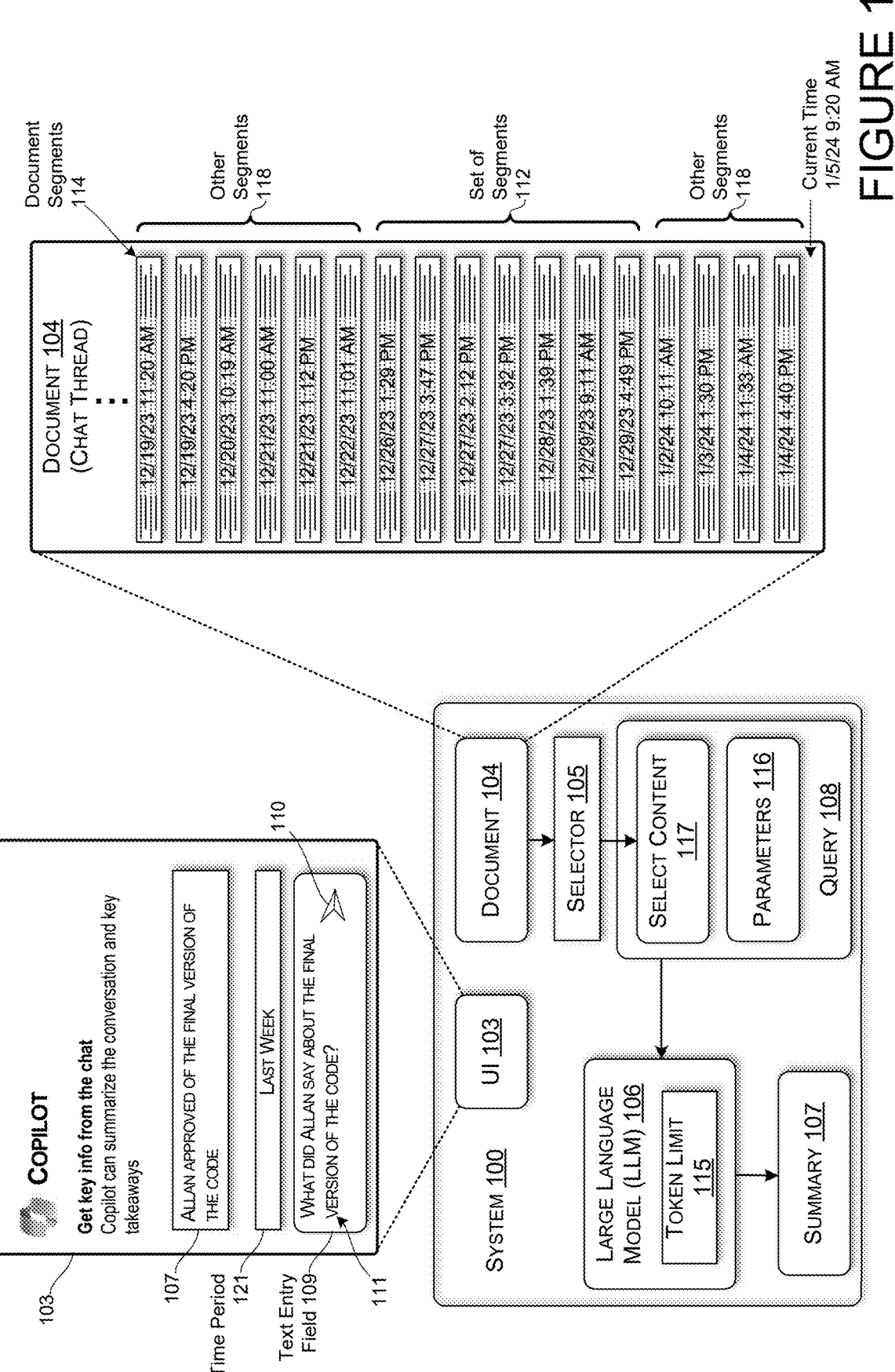
FIG. 1 is a block diagram of a system that controls the selection of segments of a document for use as grounding content for an LLM.

FIG. 1 shows a block diagram of a system 100 that controls the selection of segments 114 of a document 104 for use as grounding content for an LLM 106. The selection of the segments enables systems to generate a summary 107 using content of a document that is normally too large for LLMs. In some embodiments, the system generates a user interface 103 that enables a user type or select an input 111 in a text entry field 109. Using a token limit 115 of the LLM 106, the system can control the range of content to be used as grounding content for the LLM. In this example, the system 100 controls the range of content by displaying an individual time period 121 that is based on a token count of a set of segments 112 pertaining to the time period 121. The time period is associated with the selected set of segments that has a token count that can be supported by the token limit 115 of the LLM 106.

The document 104 can be in the form of a live document or a static document. For example, the document can be in the form of a chat thread, meeting transcript, calendar, phone call log, etc. The document can also be in the form of a word processing document or a spreadsheet with comments. The document can have individual segments 114. For example, a segment of a chat thread can include an individual message, and each message within the chat thread can be associated with a timestamp and other metadata identifying authors and recipients. The content of each segment can include text, images, videos, etc. Although the examples described herein include chat threads and transcripts, it can be appreciated that the disclosed techniques can include any type of document or file with content that can be divided in segments, and each segment can be defined by any type of delineator, e.g., spaces, commas, paragraph breaks, lines, images, predetermined words, predetermined characters or any other symbol or marking. The segment delineators can also include phrases or sentences. The set of segments that are selected from the document can be selected by any component of the system, such as a selector 105 software component.

The system can select document segments using a number of different techniques. As described in more detail below, one technique includes the use of predetermined time periods, e.g., last week, two weeks ago, etc. This can also include time periods that pertain to events, e.g., the two most recent meetings, all meetings in a particular month, all phone calls in a particular week, etc. In other embodiments, a time period can be selected based on user activity, such as communication bursts, detection of contextually relevant segments, etc. For instance, in a chat thread, certain messages having a threshold level of activity or messages pertaining to particular topics, users, and/or events can be selected for use as grounding content.

The system can determine that a time period is valid if the content of document segments pertaining to the time period has content that meets one or more criteria with respect to the token limit 115 of the language model 106. This can be done by the use of one or more techniques that can generate a token count of the selected segments 112. A number of tokens for text messages can be determined by the use of any suitable technique for quantifying individual characters and groups of characters. Although the examples disclosed herein refer to tokens, any suitable technique for quantifying content using any suitable unit of measure can be utilized with the disclosed techniques. In one illustrative example involving tokens, the phrase "ChatGPT is amazing!" consists of 6 tokens: ["Chat", "G", "PT", "is", "amazing", "!"]. In another example: "AI is fun (and challenging)!" consists of 7 tokens: ["AI", "is", "fun", "(", "and", "challenging", ")!"]. This example is provided for illustrative purposes and is not to be construed as limiting. It can be appreciated that a number of different techniques can be utilized to quantify content in selected segments to determine a number of tokens. Any unit of measure can be used to determine a quantity of content, e.g., the equivalent of a token count, and corresponding any unit of measure can be used to determine a token limit. The disclosed techniques can also include a buffer. For example, characters in different languages also have different token amounts, e.g., English uses less tokens than Hebrew. Some systems can use a generalized conversion with a buffer (ZZ characters=YY tokens and then limit to YY tokens+buffer.

The estimated token count can be determined by the use of a high-level estimate and/or by other methods that use embedding models. For example, a high-level estimate may be performed to provide an "informed guess" of what an exact token count. In using this type of method, the token count of any selected sections of a document can be determined without the need to send the content to an LLM for processing. In some embodiments, embedding models can also be used. For example, a token count can be determined during a preprocessing stage, e.g., as an estimate, and the embedding model is then applied to the preprocessed data to obtain vector representations.

If the token count of the content of the selected segments is below a threshold, e.g., a token limit of an LLM, the system can determine that a particular time period 121 pertaining to the selected segments is valid. The system can then allow use of the selected segments as grounding information to be sent to the LLM with other query parameters for causing the LLM to generate a summary. However, if the system determines that the token count of the content of the selected segments is not below the threshold, the system may reduce the time period, thereby reducing the number of selected segments and the token count. This process can be repeated until the token count of the content of the selected segments is below the threshold.

The system can also incrementally increase a time period to optimize the use of an LLM. For example, the system may start with an initial time period, e.g., a one-week time period. If the content associated with that time period is below a minimum threshold, the system can increase the time period to include more content segments up to a maximum threshold. The maximum threshold can be based on the token limit and an allocated buffer for other query parameters. Thus, if the system starts with a one-week time period, and determines that the content associated with that time period is below a minimum threshold, the system can increase the time period. The system can then determine if the new time period is associated with content having a token count that is above the minimum threshold. If the token count of the content of the new time period is above the minimum threshold and also below the maximum threshold, the system can select that new time period for processing the associated segments with the LLM. However, if the token count of the content of the new time period is below the minimum threshold, the system can continue increasing the time period until the token count of the associated content is above the minimum threshold but also below the maximum threshold. These embodiments help optimize a system to determine the right amount of grounding content. There are tradeoffs to having too little or too much grounding content. For example, if only 40 characters of grounding content is sent to an LLM, the summary of such content may be invaluable, which may be just a regurgitation of the content. The system can add one or more minimums to ensure the response quality is higher.

Thus, even though a system may start with a one-week period as a default, if the content of that initial time period is associated with content having a low token count, the system may display a longer time period that meets both the minimum threshold and maximum threshold. This technique helps with maximizing the utilization of the LLM and increasing the contextual scope of the summary, while also keeping a query and its associated content below the token limit. This helps optimize the use of the LLM with respect to computing resources. In some embodiments, the minimum threshold can be relative to the token limit. For example, the minimum threshold can be 60% of a token limit, 80% of a token limit, 90% of the token limit, 95% of the token limit, etc. In addition, the maximum threshold can be relative to the token limit as well. For example, the maximum threshold can be 98% of the token limit or the token limit minus 500 tokens or minus a predetermined number of characters, to allocate room for query parameters, etc. These examples of a minimum threshold and a maximum threshold are for illustrative purposes and are not to be construed as limiting. Any suitable value of a minimum threshold and a maximum threshold can be utilized with the techniques disclosed herein. The minimum threshold and the maximum threshold are not required to be dependent on the token threshold.

In addition to using predetermined time periods, or as an alternative to using predetermined time periods, the system can select document segments based on user activity, topics, people, etc. For example, if the document is in the form of a chat thread, and the system determines that an activity metric, e.g., a number of messages, a rate of exchanged content, or another quantity of content, is above an activity threshold for a set of messages, the system may select that set of messages and a corresponding time period. If the set of messages has a token count that is below a threshold, the system can display the time period and allow the system to communicate the set of messages to the LLM. If the token count is above the threshold, the system may reduce the set of messages by reducing the activity threshold. This method of detecting communication bursts can be combined with other techniques for identifying messages that also pertain to particular topics, users, and/or events. The messages, e.g., the selected set of segments, can be used as grounding content if the messages have a token count that is less than a maximum threshold, e.g., a token limit and a buffer for query parameters.

In another example, the system may identify segments pertaining to particular topics, users, and/or events. When using these techniques, the system also helps users discover content that may be difficult to recall. For example, a person may recall that a friend mentioned their birthday party preferences, but that person may not recall exactly what their friend said or recall where or when those preferences were communicated. The system can help that person identify where and when those preferences were communicated, and also allow the use of an LLM to operate on large quantities of documents to identify and summarize the specific preferences. The disclosed techniques allow the use of an LLM on large quantities of content while also providing improved contextual accuracy since the system uses specific segments of one or more documents, instead of some prior systems that analyzes large documents in arbitrary chunks.

In one illustrative example, if a user enters an input at the text field, such as "What did Allan say about the final version of the code?" at a text entry field, the system may identify document segments that pertain to that input. The system can identify particular document segments that pertain to a topic, e.g., "the final version of the code," and/or a person, e.g., Allan. If the document is in the form of a chat thread with Allan being an active participant within messages of the week of Dec. 24, 2023. The system can select document segments, e.g., messages, for that week. In addition, the system can select segments pertaining to a topic, such as "the final version of the code." If the segments meet one or more criteria with respect to a token limit, the segments can be used as grounding content and sent to an LLM with a prompt.

The system can also select particular document segments that pertain to particular events, which may include meetings, specific user activity, phone calls, etc. If a user enters an input 111 such as, "What did Allan say to Mike in a meeting?" the system may discover and exclusively select particular document segments that pertain to that type of event, e.g., messages or transcript sections involving those specific participants. In such an example, the system would not select document segments that are from a chat message or other forms of media. The system can then determine if those selected messages have a token count that is below a token limit. If the content of the selected messages do not exceed a token limit of the LLM or a maximum threshold, the system can select those specific messages for communication to the LLM. Although these examples refer to one type of document, the present techniques can be used to select segments that originate from a collection of different types of documents, e.g., meeting transcripts, message threads, phone records, etc. For illustrative purposes, the selected segments 112 are also referred to herein as "a set of segments 112" or a "subset of segments 112."

Once the time period pertaining to the selected segments is determined, the time period 121 is displayed on the user interface. As shown in FIG. 1, the system can cause one or more display devices to cause a display of a representation of the time period 121 pertaining to the set of segments 112 of the document 104 on a user interfaced 103. The time period can be in any suitable format. For instance, the time period can state the "past week," "past month," etc. The time period can also be represented in terms of events and/or event types. For instance, the time period can be represented as the "last meeting," "last two meetings with Allan," "all phone calls with Allan within the month of May," etc.

The system can be configured to receive a selection of the displayed time period. This selection can be accomplished by a selection of a user interface element, such as a selectable user interface element displaying the time period 121, e.g., "last week." The selection of the time period can also be invoked from a voice command, detection of a predetermined user gesture, etc. In response to receiving a selection of the time period 121, the system can generate a query 105 comprising query parameters 116 and content 117 from the set of segments 112 that pertain to the time period 121. For example, the content 117 of the set of segments 112 can include the content from all messages within the week of Dec. 24, 2023 through Dec. 30, 2023. The other segments 118, e.g., messages before and after the time period, are not generated as part of the query and those other segments 118 are not sent to the LLM. By limiting the amount of content sent to the LLM for analysis to the set of segments 112, and not including the other segments 118, the system is able to process queries for the LLM that do not exceed the token limit 115.

The query parameters can include User Query Parameters. This can include parameters such as a limit to a summary length, directives for focusing the summary on certain topics or people, etc. The query parameters can also include Corporate Query Parameters, which can include language filters, policies, etc. These preferences can include the use of certain pronouns, restrictions on names and other words that are not to be included in a summery, etc. In this example, the query 105 can include at least a portion of the input 111, e.g., "What did Allan say about the final version of the code?" or a variation thereof. The query can also include other parameters, such as a summary length limit and word preferences for the summary.

The system then communicates the query 105 comprising the query parameters 116 and the content 117 of the set of segments 112 that pertain to the time period 121 to the large language model 106. The communication can be invoked by a user input at the input element 110. The communication of the content set of segments 112 does not include content from other segments 118 that are not associated with the time period 121. The communication of the query 105 causes the language model 106 to generate the summary 107 of the set of segments 112 using the query parameters 116 and at least a portion of the initial input 111. The system can then cause a display of the summary 107 that is generated by the LLM using the query parameters 116 and the content of the set of segments 112 that pertain to the time period 121. In this example, the summary 107 generated from the query 105 and the selected segments provides an answer to the question entered in the text entry field 109, e.g., "Allan approved the final version of the code."

FIG. 2 shows another example where the system 100 displays a UI 103 showing a smart list of individual time periods 121 that are individually based on a token count of a selected set of document segments 112. Each time period 121 is associated with a selected set of segments having a token count that can be supported by a token limit of the LLM. In this example, the UI is configured to allow a user to select individual time periods and the corresponding document segments. At time ($T_0$), the system displays a user interface showing a first time period, e.g., Last Week. Upon a user selection at a user interface control element requesting the display of a second time period, at time ($T_1$), the system displays a user interface showing a second time period, e.g., Week of Dec. 17, 2023. Upon another user selection at a user interface control element requesting the display of another time period, at time ($T_2$), the system displays a user interface showing a third time period, e.g., Nov. 29, 2023 to Dec. 16, 2023.

Before the system displays a time period, the system can verify if the content of the associated segments meets one or more criteria. For example, in response to receiving an input to select the second time period, the system can analyze the document segments that are dated within the week of Dec. 17, 2023, and if the content of those document segments have a token count that is below a predetermined threshold, the system can display that second time period. However, if the content of those document segments have a token count that is above the predetermined threshold, the system may take one or more actions. In one example, the system can generate a notification indicating that the selected token count is over a token limit of an LLM. This allows the user to adjust the time period and/or select another LLM with a large token limit. The system can also automatically make adjustments to the time period.

In one illustrative example, if the token count of select segments is above a threshold, the system can remove one or more segments from the set of selected segments. Removal of segments can be based on any suitable technique. For example, in an example where a document is a message thread, text messages are selected by the LLM based on similarity matching between the embeddings of the user query and the source artifact as described above. Thus, text messages that do not meet the criteria for matching between the embeddings of the user query and the source artifact as described above, those messages may removed from the selection.

In another example, if the token count of select segments is above a threshold, the system can automatically make adjustments to the time period by reducing the time period to include fewer segments. For example, if a system initially selects a two-week time period, and the token count of the associated segments exceeds a threshold, the system may shorten the time period to de-select, e.g., remove, the oldest segments or newest segments from a set of segments. The system can reduce the time period to a point where the content of the set of segments has a token count that is less than the threshold.

For each displayed time period, the system can display information describing the associated content. For example, in the first time period, the system indicates that 3 phone call transcripts and 1 meeting transcript can be analyzed. For each time period, the system can also display an indication that the token count of that content meets the token limit.

Figure 3:
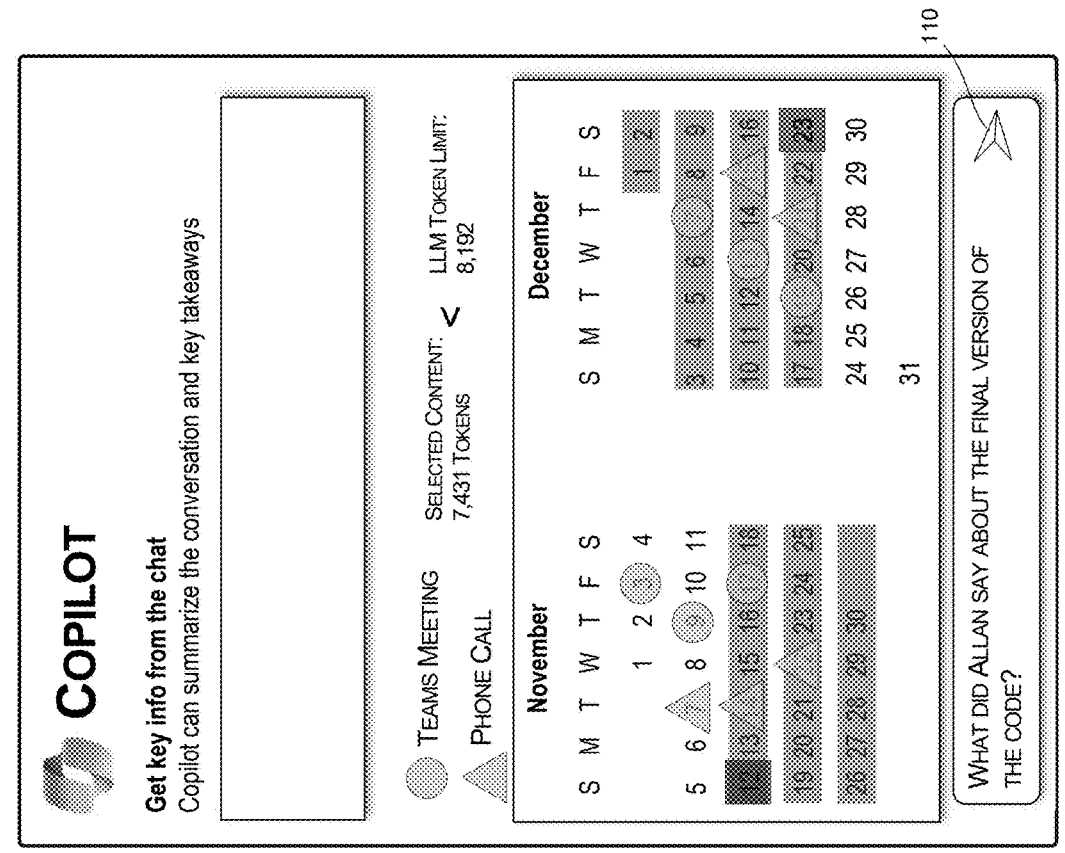
FIG. 3 shows an example of how a time period can be displayed in a calendar format.

FIG. 3 shows an example of how a time period can be displayed in a calendar format. The calendar can include highlighted dates showing a time period and associated events. In this example, the time period is from Nov. 12, 2023 to Dec. 23, 2023. The calendar also includes symbols and/or text identifying events that occurred within the time period. This example shows a scenario where the system detects that there were four (4) meetings and four (4) phone calls in the time period. These events can be selected based on their association with the time period, e.g., those events occurred within the time period. In some embodiments, the events can be selected and/or filtered based on their association with the text input, e.g., events only pertaining to Allan may be selected for analysis.

The system also analyzes the content of the events within the time period. This selected content may include a number of segments from multiple documents, e.g., call transcripts, meeting notes, messages, etc. If the system determines that the token count of the selected content of the events does not exceed a maximum threshold based on a token limit, the system can generate a notification indicating the token count and how the token count compares to a threshold. For example, as shown, the UI may provide a notification of the total token count, e.g., 7431 tokens, a token limit, e.g., 8192 tokens, and a relationship between the token count and the token limit, e.g., the count is less than the token limit. In addition, if the system determines that the token count of the content does not exceed the maximum threshold, the system can enable the user to submit the selected content for causing the LLM to generate a summary. For example, if the token count of the content does not exceed the maximum threshold the system can activate the input element 110 and allow a user input to cause the system to communicate a query and the select content to the LLM.

Figure 4A:
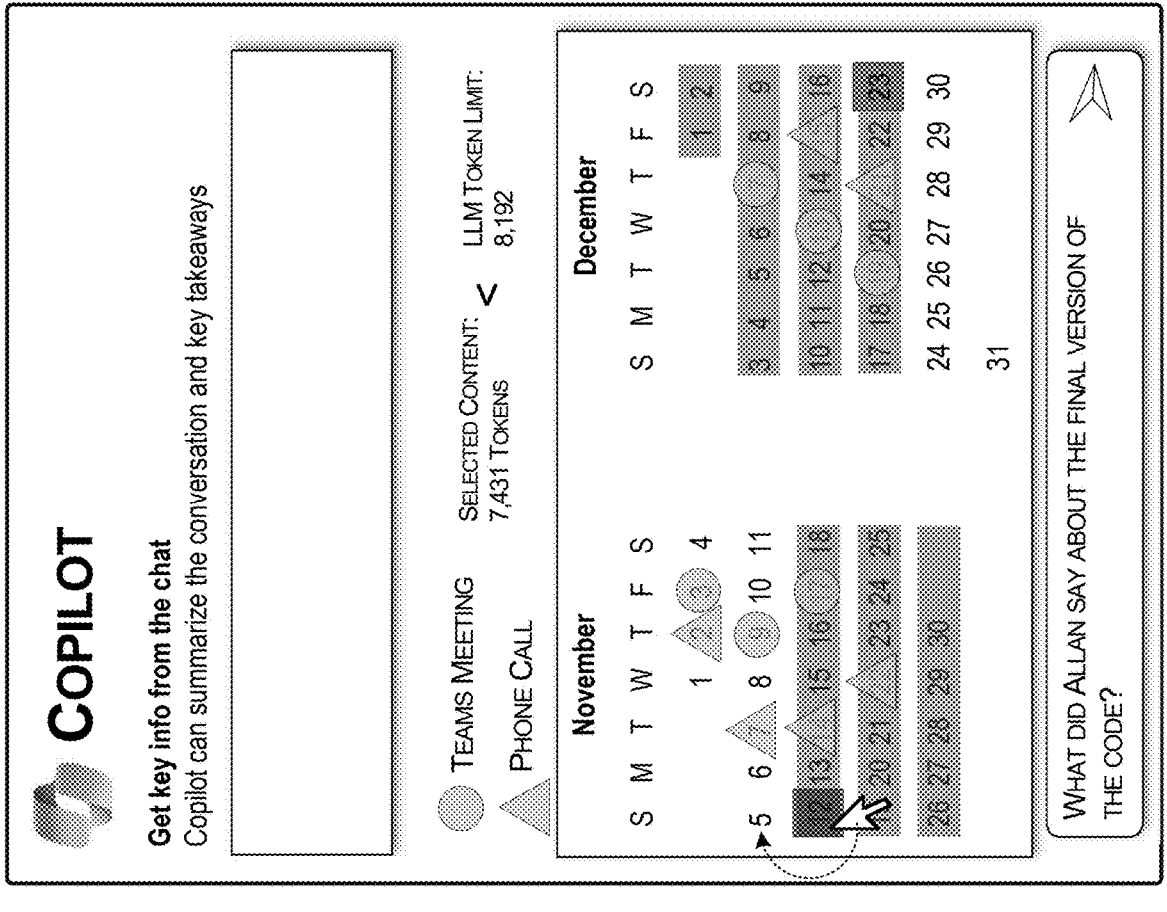
FIG. 4A shows a first state of a user interface in a process for changing a selected time period.
Figure 4B:
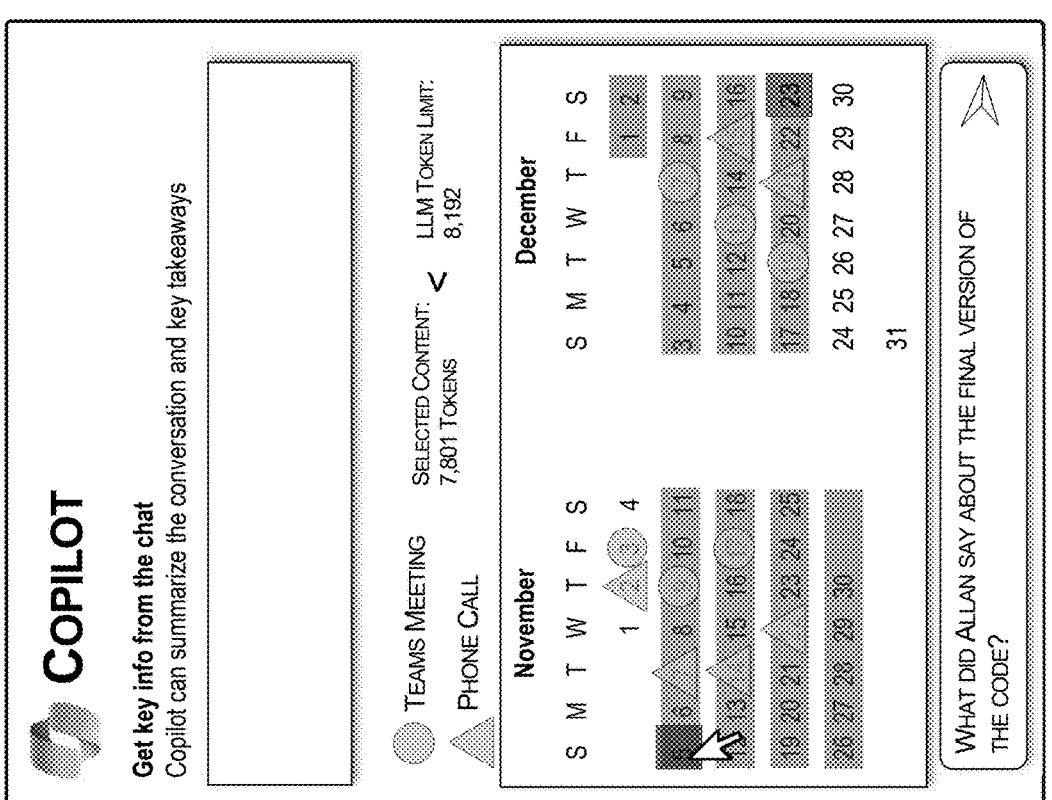
FIG. 4B shows a second state of a user interface in a process for changing a selected time period, where additional content that is selected in response to a user input meets the constraints of a token requirement.

The examples shown in FIGS. 4A-4D show how features of the user interface enable users to adjust a time period and control the selection of content to meet the token restrictions of an LLM. In such embodiments, the system can also display a dynamically adjusted indicator to show the token count of the selected content compares to a token limit. As shown in FIG. 4A, the system can display an initial time period, from Nov. 12, 2023 to Dec. 23, 2023. In response to receiving an input, such as a mouse or touchscreen input, to move the start date from Nov. 12, 2023 to Nov. 5, 2023, as shown in FIG. 4B, the system can select corresponding documents for events that occurred in the new time period. The system can then run an analysis to determine if the token count of the new set of documents is below the maximum threshold. The UI can also update the indicator to show the token count of the newly selected content compares to a token limit.

Figure 4C:
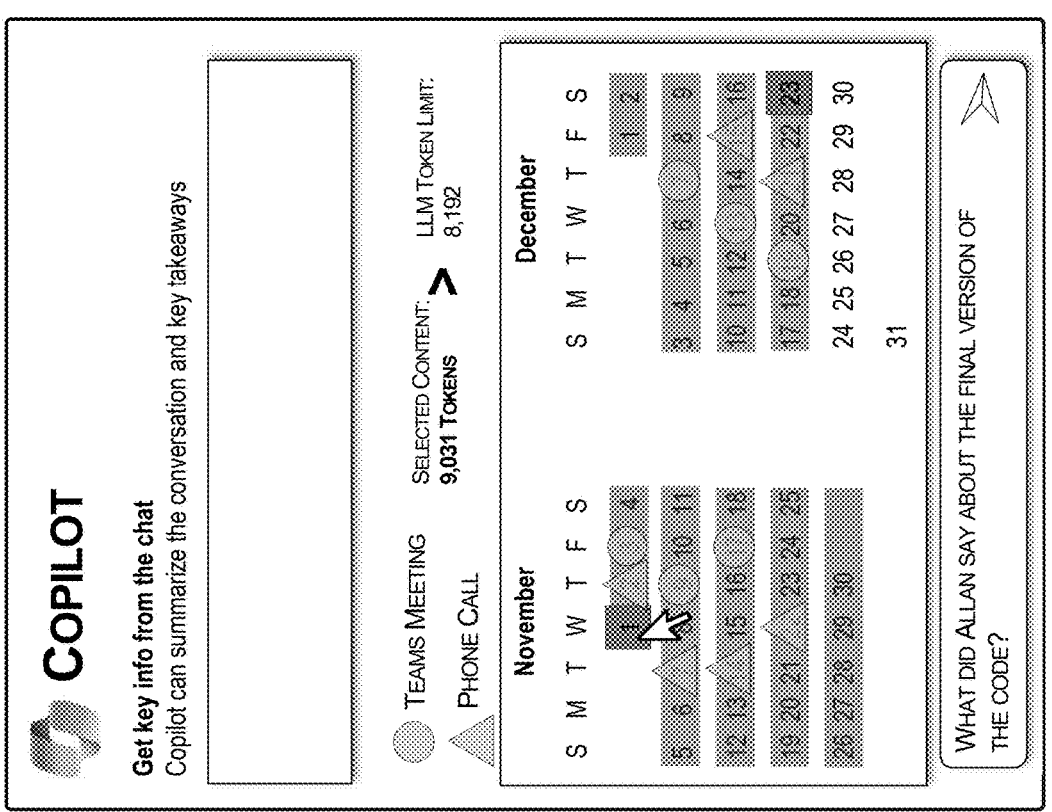
FIG. 4C shows a third state of a user interface in a process for changing a selected time period, where additional content that is selected in response to a user input does not meet the constraints of a token requirement.
Figure 4D:
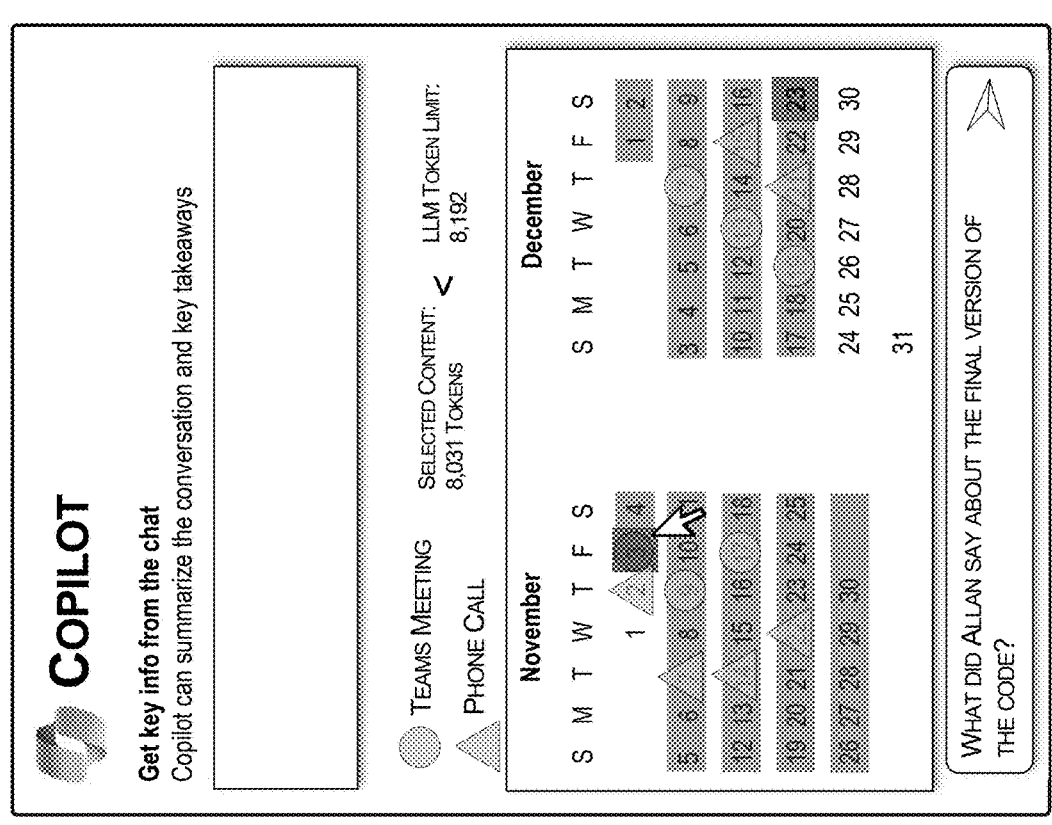
FIG. 4D shows a fourth state of a user interface in a process for changing a selected time period, where a user input reduces the selected content to meet the constraints of a token requirement.

In the transition from FIG. 4B to FIG. 4C, the user provides an input to change the time period from Nov. 5, 2023-Dec. 23, 2023 to Nov. 1, 2023-Dec. 23, 2023. In this example, the system detects that the token count for the content for the new time period, Nov. 1, 2023-Dec. 23, 2023, is above the threshold. This can provide notice to the user to make further adjustments to the time. In the transition from FIG. 4C to FIG. 4D, the user provides an input to change the time period from Nov. 1, 2023-Dec. 23, 2023 to Nov. 3, 2023-Dec. 23, 2023, where the system determines that the token count for the most recent time period is below the threshold. In response to determining that the token count for the most recent time period is below the threshold, the system can change permissions to allow the content corresponding to the most recent time to be used as grounding content for an LLM query.

In yet another embodiment, the system can control the user selection based on one or more constraints. For example, if the system receives a user input to select a new time period, the system analyzes the content related the new time period. If the content related the new time period is above a threshold, the system can restrict the user input from changing the current time period to the new time period. In the example shown in FIG. 4B and FIG. 4C, when the user provides an input to change the first time period (Nov. 23, 2005-Dec. 23, 2023) to a second time period (Nov. 1, 2023-Dec. 23, 2023), given the example dataset, the system would determine that the token count of the content of the new time period exceeds the token limit. In response, the system would restrict the user input from making this selection.

When controlling the user input, the system permits the selection of a time period having content with a token count that is below the threshold. Thus, using the example dataset, if the user input indicates a selection of the time period shown in FIG. 4D, the system would analyze the token count of the content of the selected time period and determine that this type of input is permitted since the token count is below the threshold.

Figure 5:
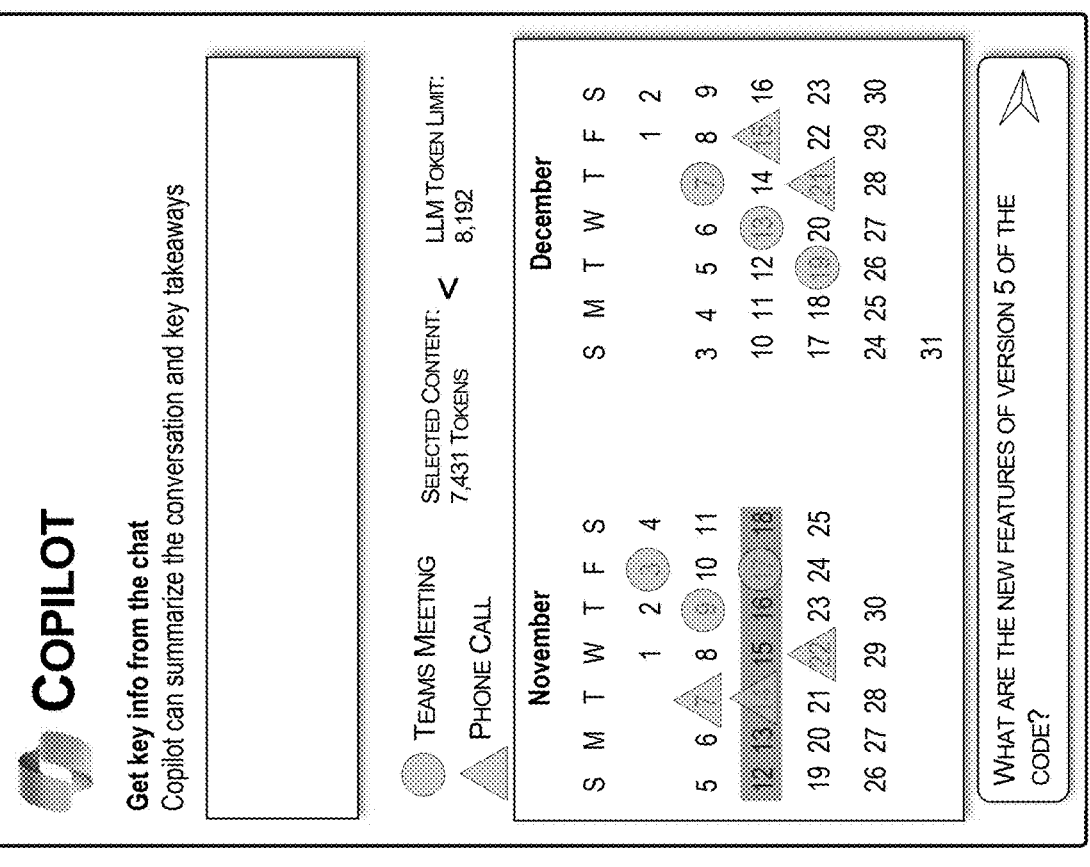
FIG. 5 shows another example of a user interface where a time period is selected based on a detection of events that pertain to a topic, person, or an event.

FIG. 5 shows another example, where a time period is selected based on a detection of events that meet one or more criteria. This may occur, for example, when a user provides a text input such as, "What did Michael say in meetings that he attended?" or "Please summarize all meetings and calls in the third week of December." In yet another example, in response to an input such as "What are the new features of version 5 of the code?" the system may identify events where features of that particular version of the code were discussed. The system can then determine if documents pertaining to those events have a token count that is less than a maximum threshold. If documents pertaining to those events have a token count that is less than the maximum threshold, they system allows those documents to be used as grounding content for an LLM query.

Figure 6:
FIG. 6 shows an example of select segments for each document that pertain to a particular topic, person, or an event.

The system can also select segments for each document that pertain to a particular topic, person, or an event. For example, as shown in FIG. 6, select segments of a document can be selected if those segments have a threshold level of relevancy to an input statement. For example, if when a user provides a text input such as, "What did Michael say about birthdays?", the system can select document segments that only pertain to Michael and birthdays. This selection of segments can be done independently from the use of a time period. This type of selection process using the text input can be based on semantic indexing/search techniques. Thus, keywords or phrases from the text input can be used to select the relevant segments. The system can then determine if those select segments 112 have a token count that is less than a maximum threshold. If those select segments 112 have a token count that is less than the maximum threshold, the system allows those select segments 112 to be used as grounding content for an LLM query.

Figure 7A:
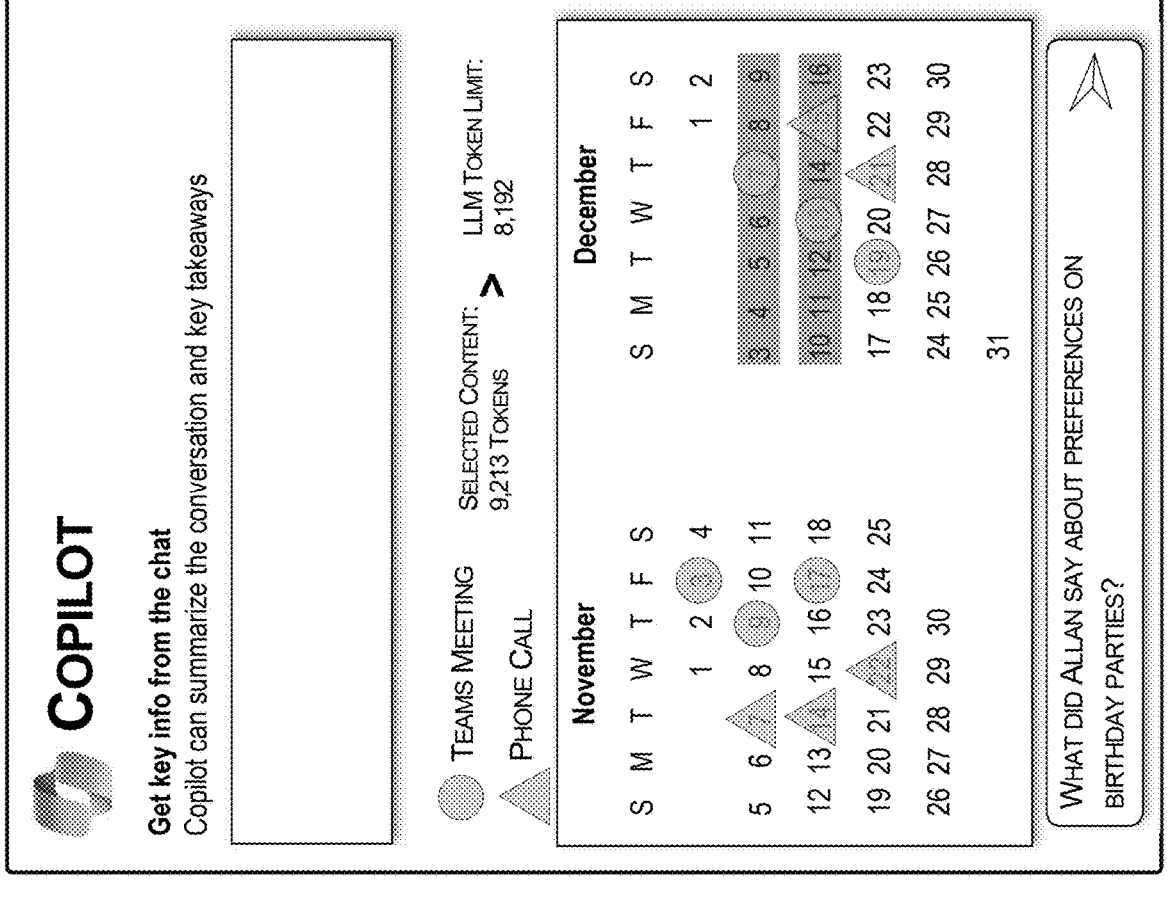
FIG. 7A shows a first state of a user interface in a process for changing a selection of a type of content.
Figure 7B:
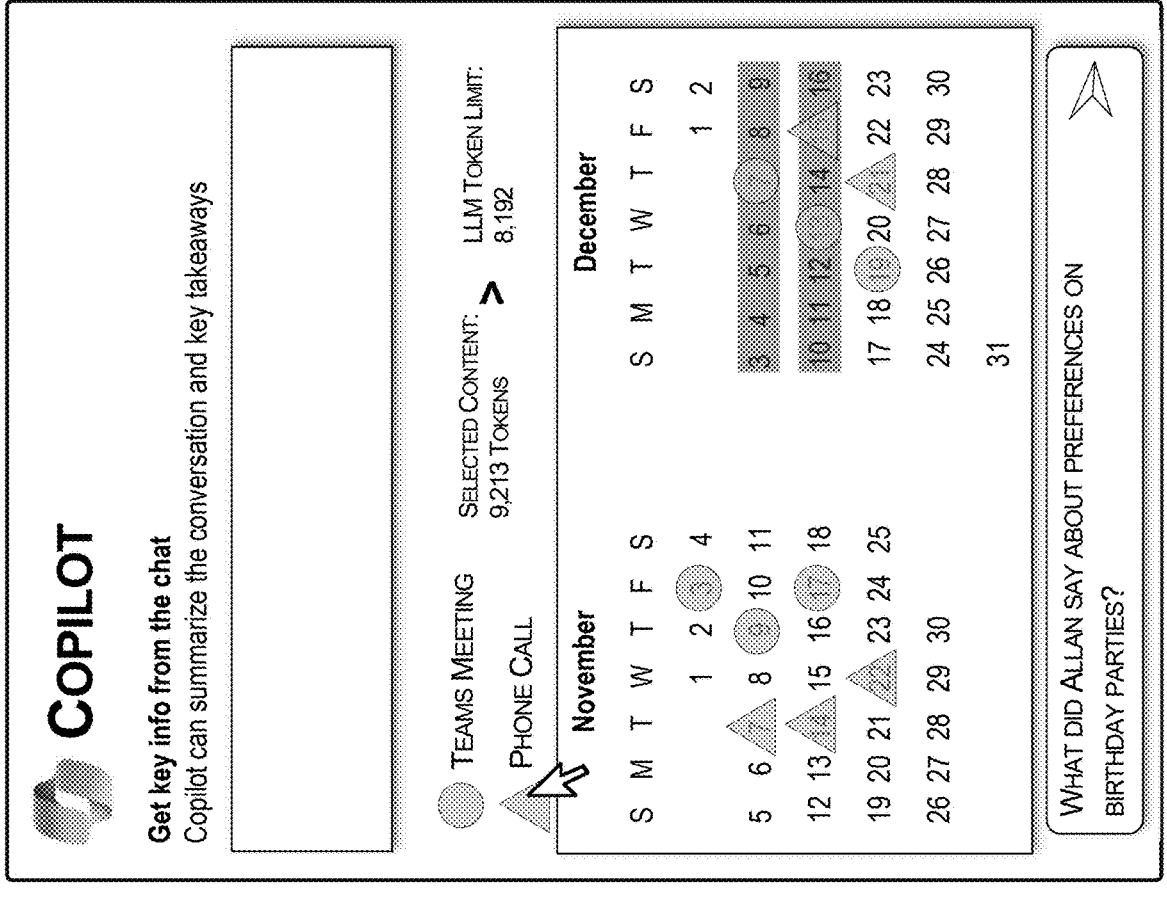
FIG. 7B shows a second state of a user interface in a process for changing a selection of a type of content, where a user input de-selects phone call transcripts from a set of selected content.
Figure 7C:
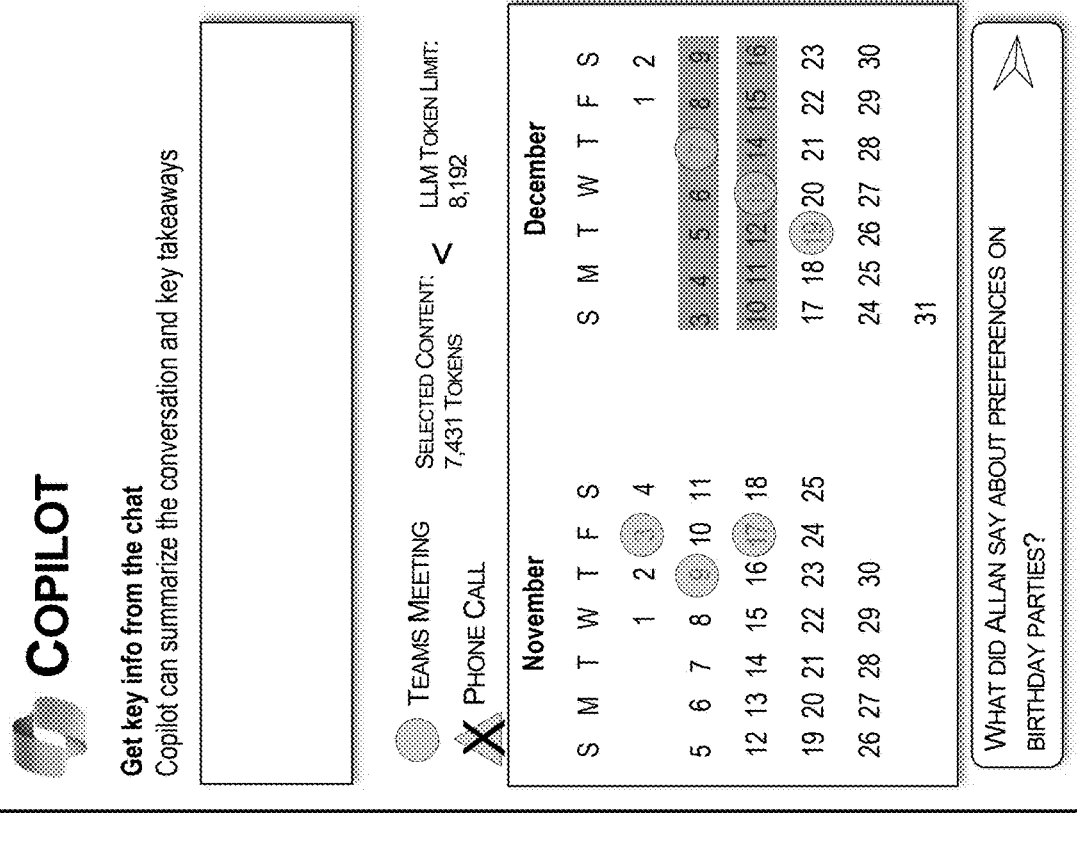
FIG. 7C shows a third state of a user interface in a process for changing a selection of a type of content, where metadata of newly selected content is displayed after phone call transcripts are removed by a user input.

The examples shown in FIGS. 7A-7C show how features of the user interface enable users to select or de-select certain types of documents. In this example, as shown in FIG. 7A, the user provides an input, which causes the system to determine a time period. The time period can be selected using any of the techniques disclosed herein, e.g., by use of a predetermined time period or a time period that is based on the selection of events pertaining to a user input. The system can also provide a visual element indicating that the time period pertains to content that exceeds a token limit. The user interface is configured to allow the user to adjust the type of content that is to be used as grounding content. For example, as shown in FIG. 7B, the UI can enable a user input to de-select the phone calls within the time period or de-select phone calls displayed on the calendar. In response to such an input, as shown in FIG. 7C, the system can reduce the selection of documents to be used to as grounding content. In this example, the new selection of content only includes meeting transcripts that occurred within the time period.

Turning now to FIG. 8, aspects of a routine 750 that causes a generation of a summary from an LLM by selecting segments of a document, where the selection of the document segments meets a token limit are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor or circuit of another remote computer (which can be a server) or a local processor or circuit of a local computer (which can be a client device receiving a message or a client device sending the message). Any aspect of the routine, which can include the generation of a prompt, communication of any of the messages with the prompt to an NLP algorithm, use of an NLP algorithm, or a display of a result generated by an NLP algorithm, can be performed on either a device sending a message, a device receiving a message, or on a server managing communication of the messages for a thread. In addition, one or more of the operations of the routine may alternatively or additionally be implemented, at least in part, by a chipset working alone or in conjunction with other software modules. Any service, circuit or application suitable for providing input data indicating the position or state of any device may be used in operations described herein.

The routine starts at operation 751 where the system receives the document 104 having a plurality of segments 114. The individual segments have content each pertaining to an individual time. The document can be a live document, e.g., a chat thread, meeting transcript with timestamps, calendar with events, call log with a transcript and timestamps, etc. The document can also be a static document, e.g., a word file having comments, spreadsheet file having comments, etc.

At operation 753, the system determines a time period 121 pertaining to the set of segments 112 of the document 104 having content that meets one or more criteria with respect to the token limit 115 of the language model 106. The system can determine a time period using a number of different techniques. In one example, a time period can be selected based on contextually relevant events. If an input text includes a question about a user, e.g., What did Allan say?" the system may select a number of events where Allan is a participant. A time period can be selected based on the time and date of each event where Allan is a participant. The system can then determine if content associated with those events comply with a token limit. If the content associated with events comply with the token limit, then the routine can continue to subsequent operations where the time period is displayed to a user. The user can then select the time period or make adjustments to the time period, then cause the system to generate a query with the content associated with the events.

The system can also select a subset of those events to ensure that the content of the events comply with a token limit. For example, if all of the events that included Allan as a participant included content that exceeded a token limit, the system can provide a notification to the user to adjust the time period or options for allowing the user to remove events. The system can also automatically shorten the time period or automatically remove content based on one or more factors. The factors can include a level of relevancy with the user input text, a quantity or age of a document segment, etc. This can remove older, newer, smaller, larger, or less relevant segments.

The time period can also be determined based on fixed options, such as, last week, last month, etc. Then the system can reduce the selected content if the associated content have a token count that exceed a threshold.

At operation 755 the system displays a representation of the time period 121 pertaining to the set of segments 112 of the document 104. This can include a calendar format or a description of a time period, e.g., "last meeting," "past week," etc.

At operation 757 the system can receive a selection of the time period 121. This can be done by a voice command, by an input at a user interface, or by any suitable gesture input.

At operation 759, the system generates a query in response to the user selection of the time period. The query can include parameters that include User Query Parameters, e.g., a limit to an answer length, directives for a summary, etc. The parameters can also include Corporate Query Parameters, e.g., filters, policies, etc. The system can also send the select content and the query to the LLM. As described in more detailed above, the system can communicate the query 105 with the query parameters 116 and the content 117 of the set of segments 112 that pertain to the time period 121 to the large language model 106. The communication of the content set of segments 112 does not include content from other segments 118 that are not associated with the time period 121. The communication of the query 105 causing the language model 106 to generate the summary 107 of the content of the set of segments 112 using the query parameters 116.

At operation 761, the system can cause a display of the summary 107 that is generated using the query parameters 116 and the content of the set of segments 112 that pertain to the time period 121. The summary 107 can be displayed on a user interface or communicated to a user by the use of an audio translation, etc.

Although the examples disclosed herein refer to the use of an LLM, the techniques disclosed herein can utilize any combination of suitable NLP algorithms that analyze and model interactions between devices and human language. Thus, the generation of the summary can also include other types of information, such as voice tone, voice volume, or voice inflections from a recording. These types of input can also enable the system to generate more accurate summaries that emphasize special points, etc. The NLP algorithms can include, but is not limited to, any suitable combination of algorithms such as Tokenization algorithms that divide a text into individual words or tokens; Part-of-Speech POS Tagging algorithms that assign grammatical labels e.g., noun, verb, adjective to each word in a sentence, helping to analyze sentence structure; Named Entity Recognition NER algorithms that identify and classify named entities, such as names of people, places, organizations, and more within a text; Sentiment Analysis algorithms that determine the sentiment or emotional tone of a piece of text, and classifying it as positive, negative, or neutral; Text Classification algorithms that categorize text documents into predefined classes or categories, such as topic classification and sentiment analysis; Machine Translation algorithms, like neural machine translation NMT, automatically translate text from one language to another; Language Modeling algorithms, including n-grams and neural language models, an also to referred to herein as a large language model LLM or a "language model," are used to predict the probability of a word or sequence of words given the context of the preceding words; Named Entity Disambiguation algorithms which help disambiguate the meaning of named entities by linking them to specific entities in a knowledge base or resolving them to their appropriate entities; Text Summarization algorithms that generate concise summaries of longer texts, which can be extractive selecting and combining sentences or abstractive generating new sentences; Speech Recognition algorithms, since the system may process speech messages and not just text messages; Information Extraction algorithms that identify structured information from unstructured text, for extracting events or facts from articles or message attachments; Coreference Resolution algorithms that determine which words or phrases in a text refer to the same entity, e.g., identifying that "he" and "John" refer to the same person in a sentence; Question Answering algorithms that answer questions posed in natural language by extracting relevant information from text corpora or knowledge bases; Word Embeddings algorithms that represent words as dense, continuous-valued vectors, which capture semantic relationships between words; Text Generation algorithms that use Recurrent Neural Networks RNNs and Transformers to create human-like text, including chatbots, content generation, and creative writing, Dependency Parsing algorithms that analyze the grammatical structure of sentences by identifying the relationships between words, including subjects, objects, and modifiers; Topic Modeling algorithms, such as Latent Dirichlet Allocation LDA, to uncover the underlying topics in a collection of documents; and Language Generation algorithms that create coherent and contextually relevant language, such as generating human-like responses in a conversational AI system.

In the example where a document is a thread, the messages of the thread can also be sent to the LLM in conjunction with a prompt that can cause the language model to determine a relevancy level between any combination of messages. For example, this system can generate a prompt requesting a level relevancy level between the third message and the first message. The prompt can also include a request for a confidence level with respect to the relevancy level. This can cause the language model to return a value indicating irrelevancy level between each combination of messages and another value indicating a confidence level. If the relevancy level or a combination of the relevancy level and the confidence level, exceed one or more thresholds, the system can determine that the topic of the third message and the topic of the first message have a threshold level of relevancy. This can be useful in a situation where the system can remove a message from a set of messages if the set of messages needs to be reduced to meet a token restriction. For instance, if the first message is related to the user prompt, and the third message is not related to the first message, the system may remove the third message from the set of messages to reduce the token count of the set of messages.

The routine described herein can also include a method defined in the following clauses:

Clause A: A method for generating a summary 107 of a document 104 by selecting a set of segments 112 from a plurality of segments 114 of the document 104 for use as grounding content for a language model 106 having a token limit 115, the method for execution on a system 100, the method comprising: receiving the document 104 having a plurality of segments 114, wherein individual segments have content each pertaining to an individual time; the input can be a "document" that is a live document or a static document, e.g., a chat thread, meeting transcript with timestamps, calendar with events, call log with a transcript and time-stamps, etc.; determining a time period 121 pertaining to the set of segments 112 of the document 104 having content that meets one or more criteria with respect to the token limit 115 of the language model 106, this can include determining a time period based on the token limit, the time period pertaining to a smart list of options last meeting, past week, etc.; causing a display of a representation of the time period 121 pertaining to the set of segments 112 of the document 104, this can include displaying the smart list options "last meeting" or "past week" using the time period; receiving a selection of the time period 121, this can include a user selection of the time period; in response to receiving the section of the time period 121, generating a query 105 comprising query parameters 116 and content 117 of the set of segments 112 that pertain to the time period 121, this can include generating the query in response to the user selection of the time period, the parameters can include User Query Parameters, e.g., a limit to an answer length, directives for a summary, etc. plus Corporate Query Parameters, e.g., filters, policies, etc.; communicating the query 105 comprising the query parameters 116 and the content 117 of the set of segments 112 that pertain to the time period 121 to the large language model 106, wherein the communication of the content set of segments 112 does not include content from other segments 118 that are not associated with the time period 121, the communication of the query 105 causing the language model 106 to generate the summary 107 of the content of the set of segments 112 using the query parameters 116, this can include sending the selected content and the query parameters to the LLM; and causing a display of the summary 107 that is generated using the query parameters 116 and the content of the set of segments 112 that pertain to the time period 121.

Clause B: the method of Clause A, where content is selected based on communication bursts, the method further comprising: determining that an activity metric with respect to the set of segments is above an activity threshold; and in response to determining that the activity metric with respect to the set of segments is above the activity threshold, selecting the set of segments for analysis with respect to the token limit of the language model.

Clause C: the method of Clauses A-B, where FIG. 2 shows where a user can select another time period from a smart list of time periods, wherein the time period is an initial time period, wherein the method further comprises: receiving selection of a second time period; in response to the selection of the second time period, determining that a token count for content associated with the second time period is below a maximum threshold; and in response to determining that the token count for content associated with the second time period is below the maximum threshold, using second time period for display for the display of the representation of the time period, and using the second time period for identifying the set of segments for use as grounding content for with the LLM to generate the summary.

Clause D: the method of Clauses A-C, where FIG. 3 and FIGS. 4A-4D show that a user can change the time period using a calendar format, wherein the representation of the time period is in a calendar format displaying a plurality of dates, and a subset of dates indicating the time period, wherein the method further comprises: receiving selection of a second time period by an input indicating a new start date or a new end date; in response to the selection of the second time period, determining that a token count for content associated with the second time period is below a maximum threshold; and in response to determining that the token count for content associated with the second time period is below the maximum threshold, using second time period for display for the display of the representation of the time period, and using the second time period for identifying the set of segments for use as grounding content for with the LLM to generate the summary.

Clause E: the method of Clauses A-D, where FIG. 6 shows features where content is selected based on a contextual relationship to a user, e.g., since User A was in a meeting last week, but was not in attendance in prior meetings, the system only includes that meeting in it's suggested time frame. This claim can be used in future claim sets without the token limit, e.g., the idea that the system helps users find specific content, wherein the set of segments is selected based on a relationship of content of the set of segments meeting one or more conditions relative to a user referenced in an input.

Clause F: the method of Clauses A-E, where FIG. 6 shows features where content is selected based on a contextual relationship with a topic, e.g., "what did Michael say about birthdays?" wherein the set of segments is selected based on a relationship of content of the set of segments meeting one or more conditions relative to a topic referenced in an input.

Clause G: the method of Clauses A-F, where content is selected based on a relationship to with specific events, e.g., "What did people say in meetings two weeks ago", wherein the set of segments is selected based on a relationship of content of the set of segments meeting one or more conditions relative to one or more events referenced in an input.

Clause H: the method of Clauses A-G, where FIGS. 7A-7C an example where a user can select content based on a content type, e.g., allow a user to de-select phone call transcripts but keep chat messages, wherein the method further comprises: receiving an input that removes one or more segments from the set of segments, wherein the input is based on a content type; and in response the input that removes the one or more segments from the set of segments, using the set of segments minus the one or more segments as grounding content for with the LLM to generate the summary.

Clause D: the method of Clauses A-C, where the system adjusts the time period to increase the amount of data to be analyzed. Start with an initial time period and increase the time period until the max is reached, wherein the time period is an initial time period, wherein the method further comprises: determining that a token count for content associated with the initial time period is below a minimum threshold; in response to determining that the token count for content associated with the initial time period is below the minimum threshold, determining a new time period having a longer duration than the initial time period; determining if a token count for content associated with the new time period is below the minimum threshold; in response to determining that the token count for content associated with the new time period is above the minimum threshold and below the token limit, using the new time period for the display of the representation of the time period, and using the new time period for determining the set of segments for use with the LLM to generate the summary.

Figure 9:
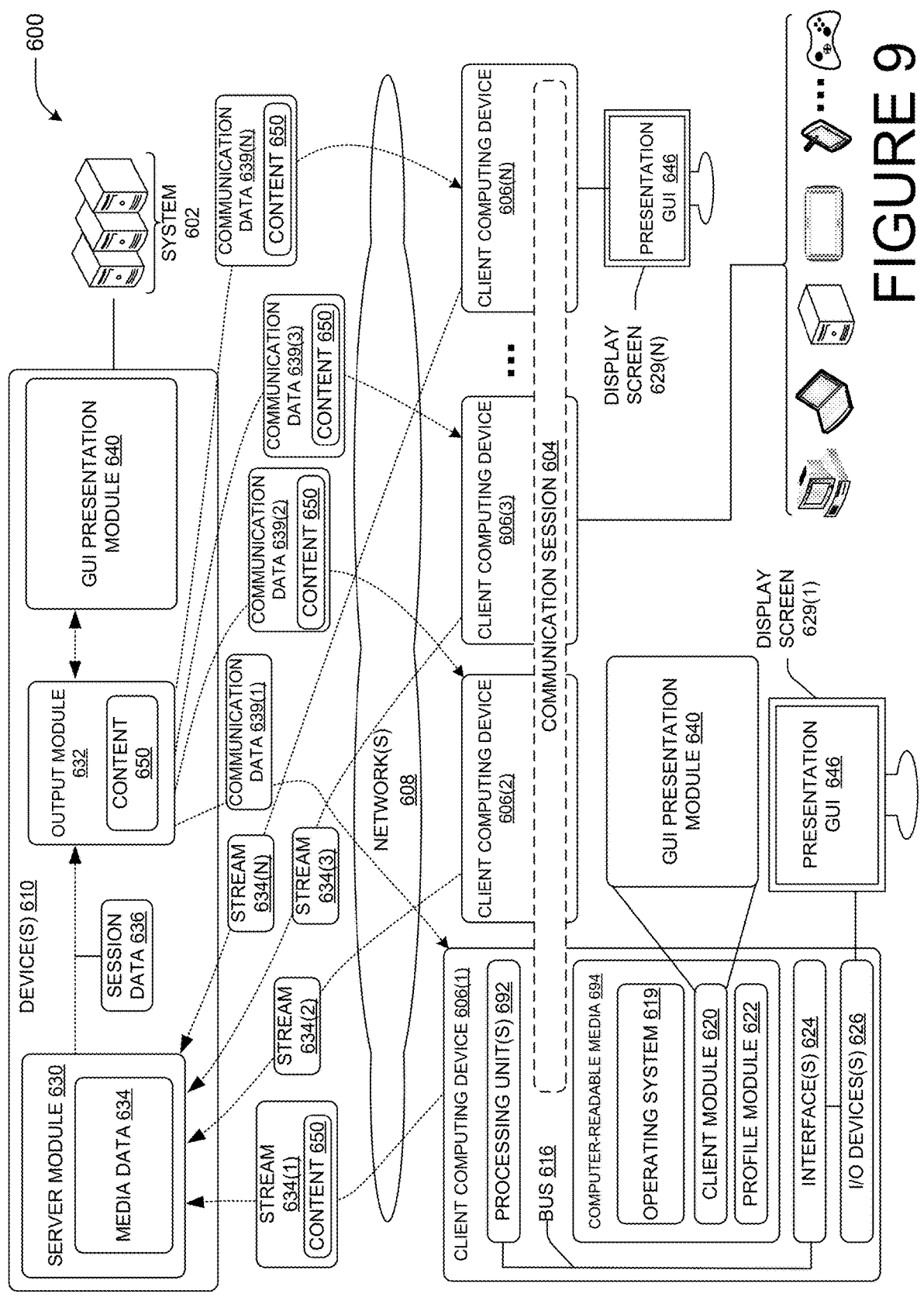
FIG. 9 is a computer architecture diagram illustrating an illustrative computer hardware and software architecture for a computing system capable of implementing aspects of the techniques and technologies presented herein.

FIG. 9 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds can be communicated with the messages.

The system 602 of FIG. 9 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses. Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 9 illustrates that client computing device 606(1) is in some way connected to a display device (e.g., a display screen 629(N)), which can display a UI according to the techniques described herein.

In the example environment 600 of FIG. 9, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 9) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 9, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 10:
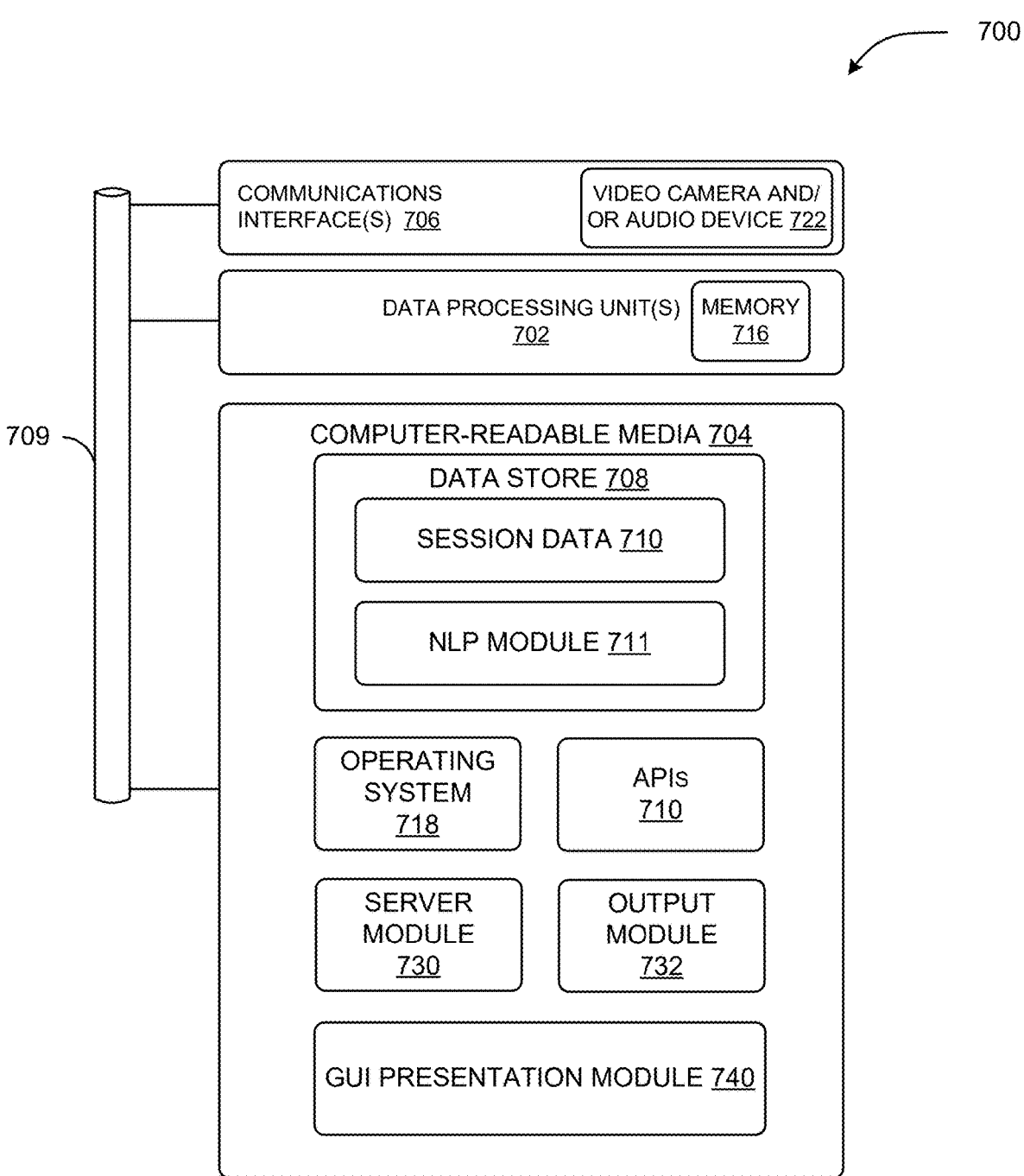
FIG. 10 is a computer architecture diagram illustrating a computing device architecture for a computing device capable of implementing aspects of the techniques and technologies presented herein.

FIG. 10 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("AS-SPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 9), profile data (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include session data 710, such as the content that includes video, audio, or other content that can be shared in a chat thread. This can include transcripts or chat threads or other documents. The data store 708 may also include an NLP module 711, which can include a large language model. The NLP module can also be part of a remote system. In such embodiments, the queries and the messages can be sent to the remote system for processing, and any device of the system 700 can receive the results generated by the NLP module on the remote system.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for generating a summary of a document by selecting a set of segments from a plurality of segments of the document for use as grounding content for a language model having a token limit, the method for execution on a system, the method comprising:

receiving the document having a plurality of segments, wherein individual segments have content each pertaining to an individual time;

determining a time period pertaining to the set of segments of the document having content that meets one or more criteria with respect to the token limit of the language model;

causing a display of a representation of the time period pertaining to the set of segments of the document;

receiving a selection of the time period;

in response to receiving the section of the time period, generating a query comprising query parameters and content of the set of segments that pertain to the time period;

communicating the query comprising the query parameters and the content of the set of segments that pertain to the time period to the large language model, wherein the communication of the content set of segments does not include content from other segments that are not associated with the time period, the communication of the query causing the language model to generate the summary of the content of the set of segments using the query parameters; and causing a display of the summary that is generated using the query parameters and the content of the set of segments that pertain to the time period.

2. The method of claim 1, further comprising:

determining that an activity metric with respect to the set of segments is above an activity threshold; and in response to determining that the activity metric with respect to the set of segments is above the activity threshold, selecting the set of segments for analysis with respect to the token limit of the language model.

3. The method of claim 1, wherein the time period is an initial time period, wherein the method further comprises:

receiving selection of a second time period;

in response to the selection of the second time period, determining that a token count for content associated with the second time period is below a maximum threshold; and in response to determining that the token count for content associated with the second time period is below the maximum threshold, using second time period for display for the display of the representation of the time period, and using the second time period for identifying the set of segments for use as grounding content for with the LLM to generate the summary.

4. The method of claim 1, wherein the representation of the time period is in a calendar format displaying a plurality of dates, and a subset of dates indicating the time period, wherein the method further comprises:

receiving selection of a second time period by an input indicating a new start date or a new end date;

in response to the selection of the second time period, determining that a token count for content associated with the second time period is below a maximum threshold; and in response to determining that the token count for content associated with the second time period is below the maximum threshold, using second time period for display for the display of the representation of the time period, and using the second time period for identifying the set of segments for use as grounding content for with the LLM to generate the summary.

5. The method of claim 1, wherein the set of segments is selected based on a relationship of content of the set of segments meeting one or more conditions relative to a user referenced in an input.

6. The method of claim 1, wherein the set of segments is selected based on a relationship of content of the set of segments meeting one or more conditions relative to a topic referenced in an input.

7. The method of claim 1, wherein the set of segments is selected based on a relationship of content of the set of segments meeting one or more conditions relative to one or more events referenced in an input.

8. The method of claim 1, wherein the method further comprises:

receiving an input that removes one or more segments from the set of segments, wherein the input is based on a content type; and in response the input that removes the one or more segments from the set of segments, using the set of segments minus the one or more segments as grounding content for with the LLM to generate the summary.

9. The method of claim 1, wherein the time period is an initial time period, wherein the method further comprises:

determining that a token count for content associated with the initial time period is below a minimum threshold;

in response to determining that the token count for content associated with the initial time period is below the minimum threshold, determining a new time period having a longer duration than the initial time period;

determining if a token count for content associated with the new time period is below the minimum threshold;

in response to determining that the token count for content associated with the new time period is above the minimum threshold and below the token limit, using the new time period for the display of the representation of the time period, and using the new time period for determining the set of segments for use with the LLM to generate the summary.

10. A computing device for generating a summary of a document by selecting a set of segments from a plurality of segments of the document for use as grounding content for a language model having a token limit, comprising:

one or more processing units; and a computer-readable storage medium having encoded thereon computer-executable instructions to cause the one or more processing units to:

receive the document having a plurality of segments, wherein individual segments have content each pertaining to an individual time;

determine a time period pertaining to the set of segments of the document having content that meets one or more criteria with respect to the token limit of the language model;

cause a display of a representation of the time period pertaining to the set of segments of the document;

receiving a selection of the time period;

in response to receiving the section of the time period, generate a query comprising query parameters and content of the set of segments that pertain to the time period;

communicate the query comprising the query parameters and the content of the set of segments that pertain to the time period to the large language model, wherein the communication of the content set of segments does not include content from other segments that are not associated with the time period, the communication of the query causing the language model to generate the summary of the content of the set of segments using the query parameters; and cause a display of the summary (107 that is generated using the query parameters and the content of the set of segments that pertain to the time period.

11. The computing device of claim 10, wherein the instructions further cause the one or more processing units to:

determine that an activity metric with respect to the set of segments is above an activity threshold; and in response to determining that the activity metric with respect to the set of segments is above the activity threshold, select the set of segments for analysis with respect to the token limit of the language model.

12. The computing device of claim 10, wherein the time period is an initial time period, wherein the instructions further cause the one or more processing units to:

receive selection of a second time period;

in response to the selection of the second time period, determine that a token count for content associated with the second time period is below a maximum threshold; and in response to determining that the token count for content associated with the second time period is below the maximum threshold, using second time period for display for the display of the representation of the time period, and using the second time period for identifying the set of segments for use as grounding content for with the LLM to generate the summary, wherein the computing device restricts the selection of the second time period in response to determining that the content associated with the second time period is above the maximum threshold.

13. The computing device of claim 10, wherein the representation of the time period is in a calendar format displaying a plurality of dates, and a subset of dates indicating the time period, wherein the instructions further cause the one or more processing units to:

receive selection of a second time period by an input indicating a new start date or a new end date;

in response to the selection of the second time period, determine that a token count for content associated with the second time period is below a maximum threshold; and in response to determining that the token count for content associated with the second time period is below the maximum threshold, use second time period for display for the display of the representation of the time period, and using the second time period for identifying the set of segments for use as grounding content for with the LLM to generate the summary.

14. The computing device of claim 10, wherein the set of segments is selected based on a relationship of content of the set of segments meeting one or more conditions relative to a user referenced in an input.

15. The computing device of claim 10, wherein the set of segments is selected based on a relationship of content of the set of segments meeting one or more conditions relative to a topic referenced in an input.

16. A computer-readable storage medium for causing a system to generate a summary of a document by selecting a set of segments from a plurality of segments of the document for use as grounding content for a language model having a token limit, the computer-readable storage medium having encoded thereon computer-executable instructions to cause the one or more processing units of the system to:

receive the document having a plurality of segments, wherein individual segments have content each pertaining to an individual time;

determine a time period pertaining to the set of segments of the document having content that meets one or more criteria with respect to the token limit of the language model;

cause a display of a representation of the time period pertaining to the set of segments of the document;

receiving a selection of the time period;

in response to receiving the section of the time period, generate a query comprising query parameters and content of the set of segments that pertain to the time period;

communicate the query comprising the query parameters and the content of the set of segments that pertain to the time period to the large language model, wherein the communication of the content set of segments does not include content from other segments that are not associated with the time period, the communication of the query causing the language model to generate the summary of the content of the set of segments using the query parameters; and cause a display of the summary (107 that is generated using the query parameters and the content of the set of segments that pertain to the time period.

17. The computer-readable storage medium of claim 16, wherein the instructions further cause the one or more processing units to:

determine that an activity metric with respect to the set of segments is above an activity threshold; and in response to determining that the activity metric with respect to the set of segments is above the activity threshold, select the set of segments for analysis with respect to the token limit of the language model.

18. The computer-readable storage medium of claim 16, wherein the time period is an initial time period, wherein the instructions further cause the one or more processing units to:

receive selection of a second time period;

in response to the selection of the second time period, determine that a token count for content associated with the second time period is below a maximum threshold; and in response to determining that the token count for content associated with the second time period is below the maximum threshold, using second time period for display for the display of the representation of the time period, and using the second time period for identifying the set of segments for use as grounding content for with the LLM to generate the summary.

19. The computer-readable storage medium of claim 16, wherein the representation of the time period is in a calendar format displaying a plurality of dates, and a subset of dates indicating the time period, wherein the instructions further cause the one or more processing units to:

receive selection of a second time period by an input indicating a new start date or a new end date;

in response to the selection of the second time period, determine that a token count for content associated with the second time period is below a maximum threshold; and in response to determining that the token count for content associated with the second time period is below the maximum threshold, use second time period for display for the display of the representation of the time period, and using the second time period for identifying the set of segments for use as grounding content for with the LLM to generate the summary.

20. The computer-readable storage medium of claim 16, wherein the set of segments is selected based on a relationship of content of the set of segments meeting one or more conditions relative to a user referenced in an input.

* * * * *